J. C. MORRISON.
Polishing Devices.

No. 139,178.

Patented May 20, 1873.

Witnesses
Julius Leonning
Ira M. Phelps

Inventor
John C. Morrison
By Gridley & Warner
his attys

AM. PHOTO-LITHOGRAPHIC CO. N.Y. (OSBORNE'S PROCESS.)

UNITED STATES PATENT OFFICE.

JOHN C. MORRISON, OF CHICAGO, ILL., ASSIGNOR OF ONE-HALF HIS RIGHT TO NELSON C. GRIDLEY AND FRANCIS F. WARNER, OF SAME PLACE.

IMPROVEMENT IN POLISHING DEVICES.

Specification forming part of Letters Patent No. 139,178, dated May 20, 1873; application filed December 30, 1872.

*To all whom it may concern:*

Be it known that I, JOHN C. MORRISON, of Chicago, in the county of Cook and State of Illinois, have invented a new, useful, and Improved Scourer, Scrubber, or Polisher, of which the following is a full, clear, and exact description, which will enable others skilled in the art to which my invention appertains to make and use the same, reference being had to the accompanying drawing forming a part of this specification, and in which—

Figure 1:
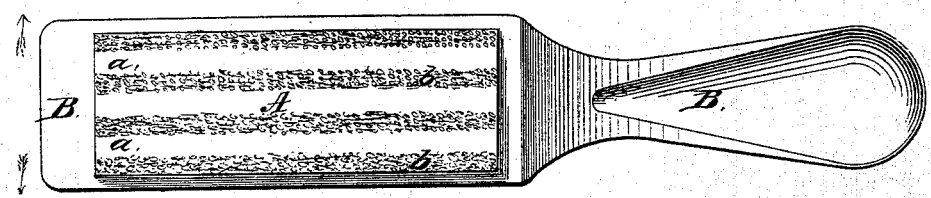
Figure 2:
Figure 3:
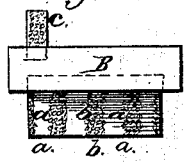
Figure 4:
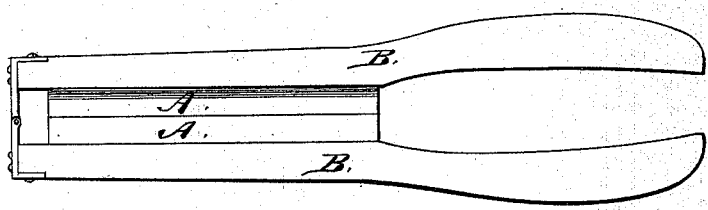

Figure 1 represents a bottom view of a scouring-utensil which embodies my invention, and Fig. 2 an end view of the same. Figs. 3 and 4 are modifications in the form and construction of the same.

The motive of my invention is to provide improved means for the purpose of cleaning and polishing metal surfaces, and for similar purposes; and to that end it consists in providing suitable utensils with a scouring-surface made of caoutchouc or India rubber. I deem it preferable, but not absolutely essential for all purposes, to use the rubber in connection with a soft fibrous material—for example, coarse cotton cloth—the rubber and the fibrous material being arranged together in alternate layers, and so attached to the utensil that the edges of the rubber and fabric will form the scouring-surface; the several well-known properties of the rubber are thus best utilized for this purpose.

In the drawing, A represents a block made of India rubber and a soft fibrous material arranged together in alternate layers, *a* represents the rubber, and *b* the fibrous material. B represents a utensil, to which the block A is so attached that the edges of the layers *a* and *b* will form the scouring-surface. Fig. 4 represents a utensil adapted for the purpose of scouring knives upon both sides at the same time, and Fig. 3 represents a utensil adapted for the purpose of scouring forks, the piece *c* being intended for the purpose of scouring the inner faces of the tines. A scouring-powder may generally be used with advantage in connection with the scourer; but the scourer is serviceable for some purposes when used alone. The best result will be produced when the scourer is moved in the direction indicated by the arrows shown in Fig. 1.

I do not here intend to limit myself either to a scouring-surface made of rubber and fibrous material arranged together in alternate layers, or to the form of the utensil; but

What I claim as new, and desire to secure by Letters Patent, is—

1. A scouring-utensil provided with a scouring-surface consisting either wholly or in part of India rubber.

2. A scouring-utensil provided with a scouring-surface consisting partly of India rubber and partly of a soft fibrous material.

3. A scouring-utensil provided with a scouring-surface consisting of India rubber and a soft fibrous material arranged together in alternate layers, and so attached to the utensil that the edges of the layers will constitute the scouring-surface, substantially as specified.

JOHN C. MORRISON.

Witnesses:
  F. F. WARNER,
  N. C. GRIDLEY.